United States Patent

[11] 3,602,202

[72] Inventor Akira Kobayashi
  Nagoya-shi, Japan
[21] Appl. No. 879,702
[22] Filed Nov. 25, 1969
[45] Patented Aug. 31, 1971
[73] Assignee Kabushiki Kaisha Toyota Chuo Kenkyusho
  Nagoya-shi, Japan
[32] Priority Nov. 30, 1968
[33] Japan
[31] 43/87731

[54] METHOD AND APPARATUS FOR REDUCING POLLUTANTS IN THE EXHAUST GAS OF AN INTERNAL COMBUSTION ENGINE
9 Claims, 11 Drawing Figs.

[52] U.S. Cl. .................................................. 123/1 A,
  48/180, 55/75, 123/119 E, 261/16, 261/52
[51] Int. Cl. ..................................................... F02b 75/10,
  F02m 25/00
[50] Field of Search ........................................ 123/1, 1 A,
  119, 119 D, 119 E, 119 A; 55/62, 75; 23/4;
  48/180; 261/16, 52

[56] References Cited
UNITED STATES PATENTS

| | | | |
|---|---|---|---|
| 1,232,215 | 7/1917 | Cabanne | 123/119 (A) X |
| 2,354,179 | 7/1944 | Blanc | 123/119 (A) |
| 2,444,222 | 6/1948 | Craig | 123/119 (E) |
| 2,715,395 | 8/1955 | Finvold | 123/119 (E) |
| 3,069,830 | 12/1962 | Skarstrom et al. | 55/75 X |
| 3,164,454 | 1/1965 | Wilson | 55/75 X |
| 3,237,615 | 3/1966 | Daigh | 123/119 (A) |
| 3,294,073 | 12/1966 | Bressan | 123/119 (A) |
| 3,313,091 | 4/1967 | Berlin | 55/75 X |

Primary Examiner—Al Lawrence Smith
Attorney—Berman, Davidson and Berman

ABSTRACT: A method and apparatus for reducing pollutants in the exhaust gas of an internal combustion engine of the type wherein air-fuel mixture is supplied to the engine combustion chamber through an air suction pipe having a carburettor with a main nozzle and a throttle valve, and comprising means for feeding oxygen to the air-fuel mixture in said carburettor when the throttle is between its closed and one-fourth open positions and the engine is operating at light load, means for stopping said oxygen feed and feeding inactive gas to the air-fuel mixture in the carburettor when the throttle valve is approximately between one-fourth and three-fourths open and the engine is operating at medium load condition, and means for stopping said inactive gas feeding and again feeding oxygen to the air-fuel mixture in the carburettor when the throttle valve is between approximately three-fourths and fully open, and the engine is operating at full load condition.

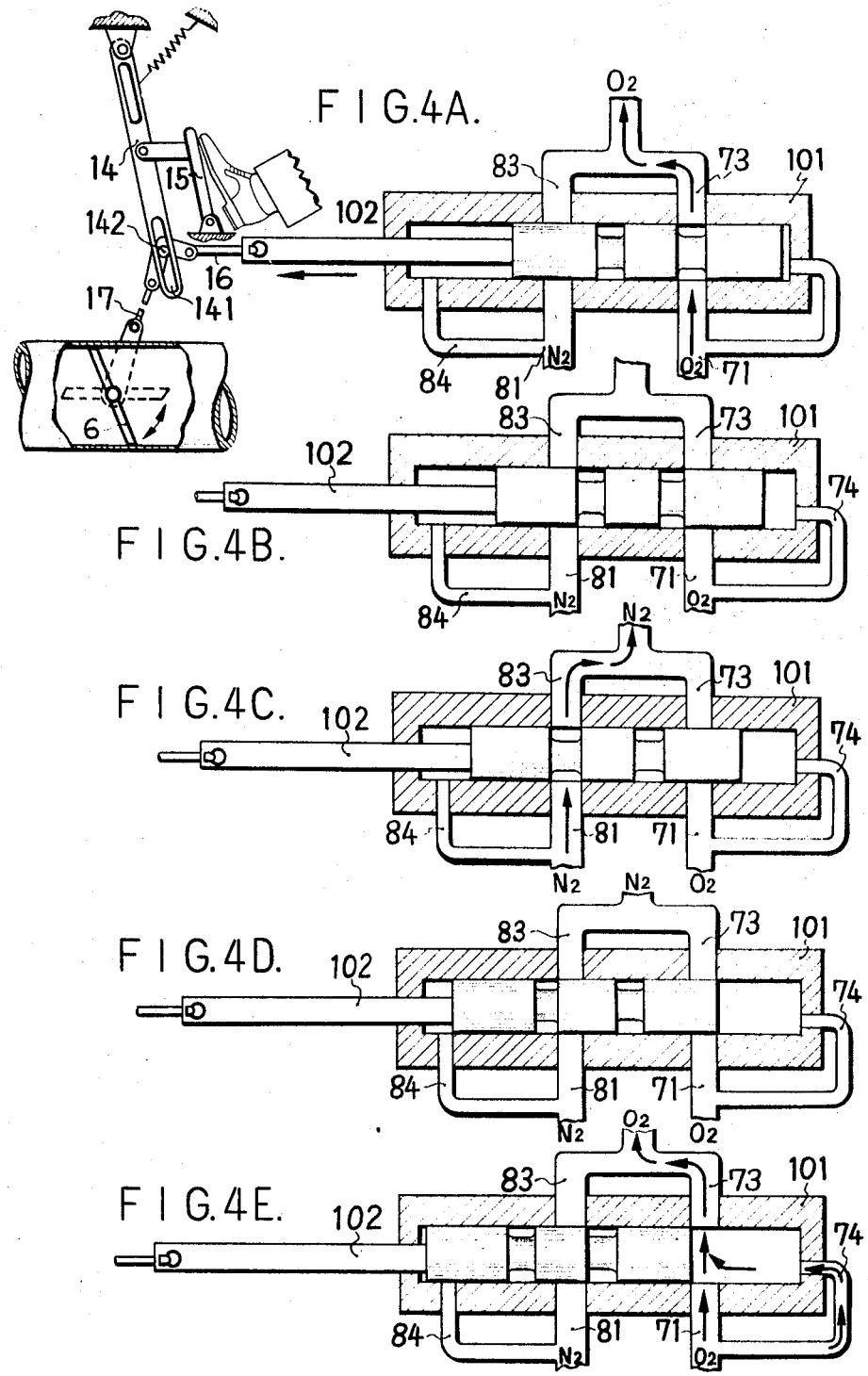

3,602,202

METHOD AND APPARATUS FOR REDUCING POLLUTANTS IN THE EXHAUST GAS OF AN INTERNAL COMBUSTION ENGINE

BACKGROUND OF THE INVENTION

This invention relates generally to a method and an apparatus for reducing pollutants in the exhaust gas of an internal combustion engine by supplying additional oxygen and nitrogen, separately, into the air-fuel mixture prior to combustion, depending upon the operating condition of the engine.

Heretofore known exhaust gas purification methods included the utilization of a low air-fuel mixture ratio in the carburetor to prevent generation of CO and HC and delaying the ignition timing so as to improve combustion, or supplying air to the exhaust to remove CO and HC from the exhaust gas by afterburning, or providing a catalyzing unit in the exhaust system to promote oxidation of CO and HC. These conventional methods are subject to defects and disadvantages and they fail to purify the exhaust gas by positive and complete combustion in the engine cylinders. The conventional methods are unreliable therefor, and fail to solve the air pollution problem. To prevent the generation of $NO_x$ there has been proposed a means for recycling a part of the exhaust gas or injecting water into the suction air-fuel mixture prior to combustion. These proposals have not been adopted because of the undesirable pollution of the carburetor suction system, the lowering of engine output, and other fundamental disadvantages.

SUMMARY OF THE INVENTION

The present invention provides means for adding oxygen or nitrogen to the carburetor air-fuel mixture in correspondence with the operational condition of the internal combustion engine. Means is provided for supplying the oxygen or nitrogen selectively in response to opening of the throttle valve of the carburetor through a valve mechanism interlocking with the throttle valve and thereby controlling feed of the oxygen or nitrogen from an oxygen cylinder or a nitrogen cylinder. Rather than utilizing oxygen and nitrogen cylinders which must be refilled with these gases at intervals, a container of zeolite particles may be utilized for a much longer and more continuous period of time to separate oxygen and nitrogen from air supplied to the container, and to feed the same either directly to the carburetor, or to the oxygen and nitrogen supply storage cylinders. If desired, an oxygen supply source may be used alone, or a nitrogen supply source may be used alone at appropriate engine operating conditions. Alternatively, the oxygen supply source of the present invention for avoiding the generation of CO and HC and a conventional $NO_x$ prevention device may be used. If desired, a nitrogen supply source for preventing the generation of $NO_x$ according to the present invention and a conventional means for preventing the generation of CO and HC may be used in combination for preventing the generation of CO, HC and $NO_x$ through the entire range of engine operating conditions.

The primary object of the present invention is to provide a method and an apparatus for preventing the generation of harmful components in the exhaust gas of an internal combustion engine and, thereby, obviate the inherent defects and disadvantages of conventional methods and apparatus as briefly outlined above.

Another object of the invention is to provide an apparatus for positively preventing the generation of harmful components in the exhaust gas by supplying oxygen and an inactive gas such as nitrogen separately, and under different engine operating conditions, to the air-fuel mixture prior to combustion of the engine.

A further object of the invention is to provide means for selectively supplying the oxygen or inactive gas at appropriate times corresponding to particular operating conditions of the engine.

A still further object of the invention is to provide means for supplying oxygen or nitrogen to the air-fuel mixture of the engine for a long period of time without need for replacing the oxygen and nitrogen sources.

BRIEF DESCRIPTION OF THE DRAWINGS

The novel features that are considered characteristic of the invention are set forth with particularity in the appended claims. The invention, itself, however, both as to its organization and its method of operation, together with additional objects and advantages thereof, will best be understood from the following description of specific embodiments when read in connection with the accompanying drawings, wherein like reference characters indicate like parts throughout the several Figures, and in which:

FIGS. 4A, 4B, 4C, 4D, and 4E are schematic diagrams of a valve mechanism for controlling the feed of oxygen and nitrogen from their sources in the embodiment of FIG. 3, showing the linkage to the carburetor throttle valve and various operating positions of the valve mechanism as related to different openings in the throttle valve;

DESCRIPTION OF A PREFERRED EMBODIMENT— METHOD

Figure 1:
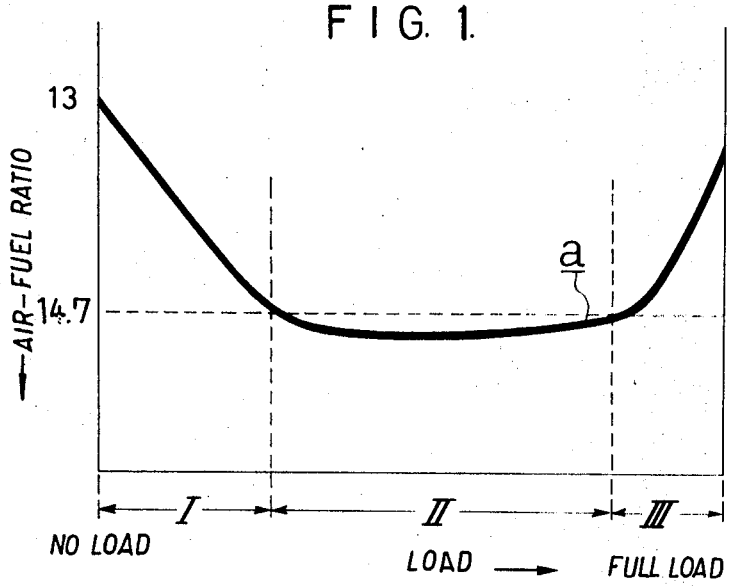
FIG. 1 is a diagram showing the relation between the air-fuel ratio and the engine load in a gasoline engine for an automobile.

Referring now more particularly to the drawings, conventional gasoline engines are generally designed to supply air-fuel mixture from a carburetor to a combustion chamber in the ratio as shown by curve a of FIG. 1 so as to operate the engine smoothly and economically over the entire range of operational conditions at widely varying rotational speeds and loads. In FIG. 1, the abscissa denotes the load condition of an engine and corresponds to the opening of the carburetor throttle valve, and the ordinate shows the air-fuel mixture ratio. The theoretical air-fuel ratio (theoretical value being about 14.7) is shown in FIG. 1 by the broken horizontal line. In ordinary gasoline engines, the air-fuel ratio increases (meaning that the mixture becomes progressively leaner) between null, or closed, to one-fourth opening of the throttle valve (operational area I). When the opening of the throttle valve is approximately between one-fourth to three-fourths (operational area II) a mixture slightly leaner than that of said theoretical air-fuel ratio is supplied, and when the opening of the throttle valve approaches and exceeds three-fourths (operational area III), the air-fuel ratio decreases and a richer mixture is supplied as the opening of the throttle valve becomes larger.

Figure 2:
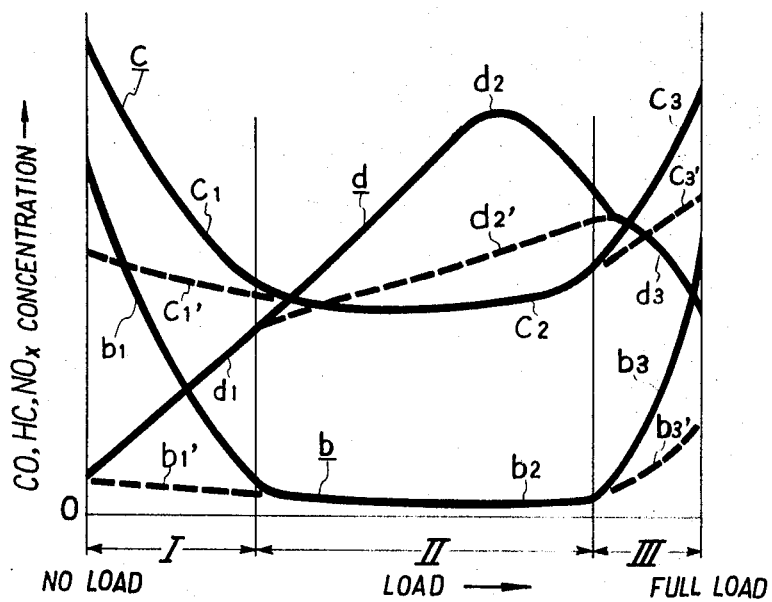
FIG. 2 is a diagram showing the relation between concentration of harmful components in the exhaust gas and the engine load.

Experiments were conducted with the conventional engine to determine the amounts of harmful components such as carbon monoxide (CO), hydrocarbon (HC) and nitrogen oxide ($NO_x$) in the exhaust gas with results as portrayed in the diagram of FIG. 2, wherein the loading conditions of the engine are shown along the abscissa and the concentration of harmful components in the exhaust gas are measured along the ordinate. The solid line curve $b$ shows the concentration of CO. Carbon monoxide rapidly decreases as the air-fuel ratio increases in the operational area I, as shown by the concentration $b_1$, and it is extremely small in the operational area II as shown by the concentration $b_a$, but it drastically increases in the operational area III, as shown by the concentration $b_3$. In the same diagram, it is noted that the concentration of hydrocarbon, HC shown by curve $c$, follows the same pattern as the concentration of CO, but at even higher values. The concentration of $NO_x$ (curve $d$) is considerably different from the concentrations of CO and HC and rapidly increases in the operational area I as shown by the concentration $d_1$. In the operational area II, the $NO_x$ increases at the same rate, but begins to decrease after one-half opening of the throttle valve, as shown by concentration curve portion $d_2$ which is of chevron shape. In the operational area III, the $NO_x$ concentration continues to decrease rapidly as shown by the concentration portion of the curve $d_3$.

Thus, it was found that the air-fuel ratio in the area I (no load to light load condition) is low, and the residual, or unburned gas, is, therefore, large in amount when the throttle valve, which controls the amount of suction of the mixture into the carburetor, is between its fully closed position and its position of one-fourth open. Thus, the fuel is lean and the combustion is not good. A mixture richer than that of the theoretical mixture ratio (about 14.7) is supplied in the operational area I, and due to the shortage of oxygen compared with the amount of fuel supplied, the combustion is not complete so that harmful components such as CO and HC are discharged with the exhaust gas and in consequence, the atmosphere is polluted. Also, in this operational area, $NO_x$ seldom exists in the exhausted gas because the combustion temperature is rather low to produce $NO_x$.

The above findings led to the discovery, according to the present invention, that in the operational area I it is desirable to positively supply additional oxygen to the air-fuel mixture and thereby raise the concentration of oxygen to accomplish better combustion and lower the CO concentration from the concentration $b_1$ (solid line) to the concentration $b_1'$ (broken line) as shown in FIG. 2, and the HC concentration from $c_1$ (solid line) to $c_1'$ (broken line). In this way, excess gasoline is positively burned to increase the engine output in the no-load to light-load area, and to improve the engine thermal efficiency.

In the medium load operational area II, in which the throttle valve is between one-fourth to three-fourths open, the dilution of air-fuel mixture by residual gas is smaller and the combustion is better. Therefore, a mixture of theoretical mixture ratio, or a mixture even leaner than that may be supplied, and since it is more economical, a leaner mixture is supplied from the carburetor (FIG. 1). Accordingly, CO and HC are at low concentration values as oxygen is sufficient for the supplied fuel (FIG. 2, curves $b_2$ and $c_2$), but in this operational area the combustion temperature is much higher and $NO_x$ is produced in greater quantity so that the concentration of harmful $NO_x$ in the exhaust gas becomes greater (FIG. 2, curve $d_2$). These findings led to the discovery that in this operational area a harmless and inactive gas, such as nitrogen, should be positively added to the air-fuel mixture to lower the combustion temperature by diluting the mixture with the inactive gas, and to retard the generation of $NO_x$ (FIG. 2, line $d_2'$).

The reason for the generation of $NO_x$ is now considered in the above-described operation area II. The ignition of the air-fuel mixture is very good, and the combustion temperature is rather high since the progress of combustion of the air-fuel mixture is rapid. Because of the high combustion temperature, part of the nitrogen contained in the air-fuel mixture combines with oxygen to generate $NO_x$. Generation of $NO_x$ means wasteful consumption of part of the oxygen in the air required for combustion of the gasoline. By experiment, it has been proved that when additional nitrogen, or another inactive gas, is supplied into the engine together with the fuel mixture, the combustion temperature is lowered without lowering the combustion efficiency, in spite of the increase in the amount of nitrogen in the take-in air. With the lowering of temperature, the generation of $NO_x$ is reduced, and oxygen in the air is effectively used for combustion of the air-fuel mixture. Choice of an inactive gas that generates harmful gas by oxidation at the combustion temperature of the engine is not desirable. It is better to use nitrogen, which may be secondarily obtained by use of zeolite apparatus as later described, or to use byproduct nitrogen obtained by a conventional process for separating oxygen from the atmospheric air.

In the operational area III, representing heavy to full engine load, from three-fourths to full opening of the throttle valve, the air-fuel mixture is richer than that of the theoretical mixture ratio in order to raise the engine output (FIG. 1). As a result, the oxygen in the air is completely utilized in burning the gas and the engine output reaches its maximum, but the excess fuel will cause incomplete combustion and in consequence, the concentration of CO and HC rises (FIG. 2, curves $b_3$ and $c_3$).

Accordingly, in this operational area, additional oxygen is positively supplied in the air-fuel mixture, as in the case of operational area I, described above, by which combustion in the cylinder is completed and the generation of CO and HC is reduced (FIG. 2, curves $b_3'$ and $c_3'$), and thereby the engine output is raised.

Thus, the combustion in each operational area of the internal combustion engine is considered and, according to the method of this invention, additional oxygen is supplied to the air-fuel mixture in the light load operational area I and the heavy load operational area III to reduce CO and HC, while additional nitrogen is supplied in the air-fuel mixture in the medium load operational area II to reduce $NO_x$, whereby generation of harmful components is avoided under all engine-operating conditions.

DESCRIPTION OF PREFERRED EMBODIMENTS—APPARATUS

Figure 3:
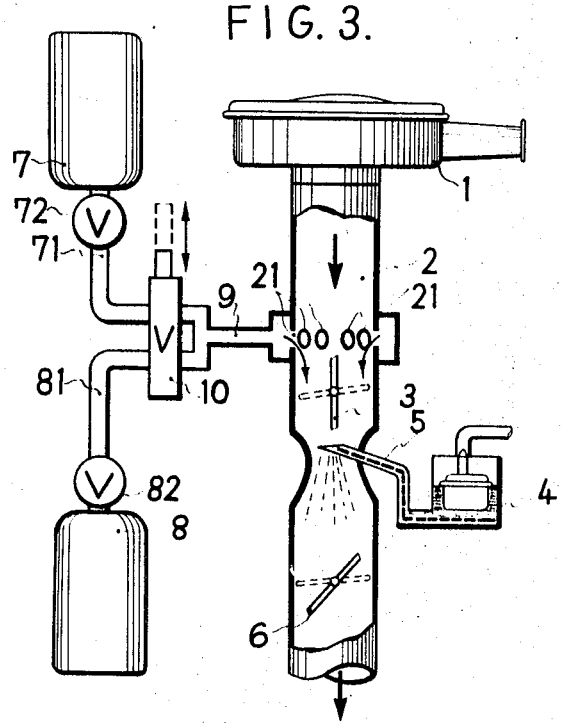
FIG. 3 is a diagram showing an embodiment of the device according to the present invention which enables the addition of oxygen or an inactive gas such as nitrogen to the air-fuel mixture of an internal combustion engine.

A preferred apparatus for performing the method described above is shown in FIG. 3. An air filter 1 leads to an air-suction pipe 2. The lower portion of suction pipe 2 forms a carburetor having a main nozzle 5 connected to a fuel source 4 (called a float chamber), an air valve 3, and a throttle valve 6 (otherwise called the gas valve) for controlling the amount of air-fuel mixture supplied to the combustion chamber of the engine. Opening movement of the throttle valve is controlled by the accelerator pedal 15, FIG. 4A. The foregoing parts form a conventional carburetor mechanism for an internal combustion engine, and to these, in the present invention, are added an oxygen supply cylinder 7, a nitrogen supply cylinder 8, and additional means for feeding the oxygen and nitrogen separately to the carburetor, as will now be described. The cylinder 7 is connected by an oxygen supply conduit 71 to a manifold 9 terminating in a ring surrounding the air supply pipe 2 and communicating with the interior thereof by a plurality of openings 21 spaced around the wall of the air supply pipe within the manifold. A nitrogen feed, or supply, conduit 81 similarly connects the cylinder 8 to the manifold 9. Conduits 71 and 81 are respectively controlled by electromagnetic valves 72 and 82 operative to open or close by passage and nonpassage of an electric current, as will be later described. A changeover distribution valve 10, interlocked with the throttle valve 6, as will later appear, is provided for preferentially opening and closing the oxygen supply conduit 71 and the nitrogen supply conduit 81 according to the opening of the throttle valve 6. The circular portion of manifold 9 and the openings 21, although shown to be positioned at the upper part of the carburetor above the air valve 3, may be provided in any part of the air suction pipe 2 between the air filter and the combustion chamber of the engine, and the position of manifold 9 is not limited to the upper part of the carburetor as illustrated in the diagram of FIG. 3.

The changeover distribution valve 10 is positioned in the oxygen and nitrogen supply lines ahead of manifold 9, and may be constructed as shown in FIG. 4A as constituting a spool valve 102 which is slidably received in the cylindrical valve body 101. In the cylinder walls are disposed a pair of diametrically opposed ports, to which are connected the oxygen supply conduit 71 and the pipe section 73 leading to the manifold 9 of FIG. 3. Similarly, another pair of diametrically opposed ports are connected to the nitrogen supply conduit 81 and the nitrogen pipe section 83 leading to the manifold 9. Each port of the aforementioned pairs of ports is communicated with the other through a groove of the pair of grooves formed in the valve spool 102, so that when the spool is moved from right to left, and vice versa, in the cylinder, one or the other of the grooves will align at a given time with the one or the other of said pairs of ports to feed oxygen or nitrogen to the carburetor while blocking movement of the other gas. A pipe 74 is provided for returning residual oxygen in the cylinder to the oxygen supply conduit 71 when the spool valve 102 approaches the extreme right end of the cylinder. A similar pipe 84 permits the return of residual nitrogen in the cylinder to the nitrogen supply conduit 81 when the spool valve 102 approaches the extreme left end of the cylinder, as viewed in FIG. 4A.

FIGS. 4A through 4E show various opening and closing conditions of the distribution valve in the various operational areas, or conditions of engine operation. FIG. 4A shows the condition in which the spool valve 102 has moved to the right end of the cylinder, opening the oxygen supply conduit 71, and closing the nitrogen supply conduit 81. FIG. 4B shows the valve 102 moved slightly to the left, closing both the oxygen and nitrogen supply conduits. FIG. 4C shows the spool valve 102 moved further to the left to open the nitrogen supply conduit, while the oxygen supply conduit remains closed. FIG. 4D shows the spool valve 102 moved still further to the left to close both the oxygen and nitrogen supply conduits. When the spool valve moves completely to the left, as shown in FIG. 4E, the oxygen supply conduit is opened, and the nitrogen supply conduit is closed. The movements of the spool valve are caused by a mechanical interlock with the accelerator pedal and the throttle valve 6, as described below.

As shown in FIG. 4A, the interlock mechanism includes a connecting rod 14 pivotally connected to, and movable with the accelerator pedal 15, a connecting rod 17 driving the throttle valve 6, and a connecting rod 16 driving the spool valve 102. The ends of connecting rods 16 and 17 are pivoted to a crank element having a pivot pin 142 slidable in a guide slot 141 formed in the free end of the connecting rod 14. Accordingly, counterclockwise opening movement of the throttle valve 6 corresponds to leftward movement, or depression, of the accelerator pedal 15 caused by foot pressure thereon. When the throttle valve 6 is fully closed, the distribution valve 10 is in its position shown in FIG. 4A. When the throttle valve is one-fourth open, the spool valve 102 is in the position shown in FIG. 4B. Similarly, opening the throttle valve one-half moves valve 102 to its position of FIG. 4C; opening the throttle valve three-fourths corresponds to the valve 102 position of FIG. 4D; and fully opening of the throttle valve 6 corresponds to the valve 102 position shown in FIG. 4E. In consequence, in the engine light load operational area, from null to approximately one-fourth opening of the throttle valve, only the oxygen feed conduit 71 is opened; in the engine medium load operational condition, from one-fourth to three-fourths opening of the throttle valve 6, only the nitrogen conduit 81 is opened; and from approximately three-fourths to full opening of the throttle valve, only the oxygen conduit 71 is opened. In this way, only oxygen or nitrogen is selectively supplied in the carburetor suction pipe at an appropriate time considering the engine operating condition.

Figure 5:
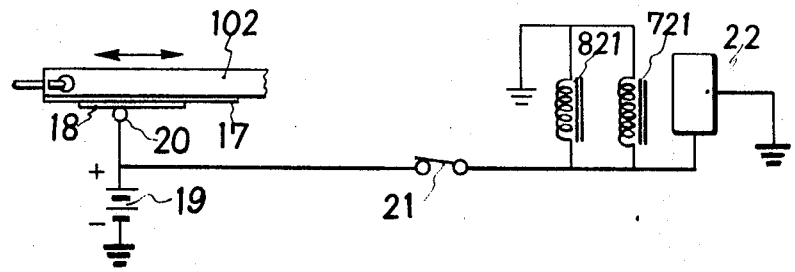
FIG. 5 is a diagram showing an electrical circuit for operating shutoff valves in the oxygen and nitrogen feed supply conduits of the embodiment of FIG. 3.

The oxygen supply valve 72, FIG. 3, and nitrogen supply valve 82 are opened in correspondence with the operation of the engine by the circuit shown in FIG. 5. An electrode 18, insulated by material 17, is attached to the left end of the spool valve 102. The electrode is contacted by a fixed contact 20 connected to one side of a battery cell 19, whose other side is grounded. Terminal 20 is connected to the ungrounded side of the engine ignition circuit 22 through the ignition key switch 21. Electromagnetic solenoids 721 and 821 are connected in parallel with each other and the ignition circuit 22, and these solenoids respectively operate the valves 72 and 82. Thus, the electromagnetic valves 71 and 81 are opened simultaneously as the key switch is closed and the engine starts operation. The left end of the electrode 18 contacts the terminal 20 when the spool valve 102 begins to move from the position of FIG. 4A to the left, and the right end of the electrode 18 contacts the terminal 20 when valve 102 reaches the position shown in FIG. 4E. Therefore, starting simultaneously with the start of the engine, the control valves 72 and 82 are opened and oxygen and nitrogen from cylinders 7 and 8 are supplied to the carburetor under control of valve 102 is appropriate to the operating condition of the engine in accordance with the depression of the accelerator pedal and the opening of the throttle valve.

The above-described embodiment supplies both oxygen and nitrogen to the carburetor, but obviously, only oxygen, or nitrogen may be supplied, and the changeover valve 10 may be modified to use single, instead of double piping. In such instance, for example, only the described nitrogen supply device may be combined with a conventional catalyst device for promoting the oxidation of CO and HC to thereby restrict the generation of CO, HC, and $NO_x$. Also, it is possible to use only the described oxygen supplying device in combination with other devices for restriction of generation of $NO_x$. When only an oxygen supplying device is used, the distribution valve 10, which interlocks with the throttle pedal in the same manner as previously described, is provided with a single piping which opens at spool valve 102 positions of FIGS. 4A and 4E.

A zeolite apparatus may be used to supply oxygen and nitrogen continuously and over a long period of time. This device utilizes zeolite to separate oxygen and nitrogen by adsorbing nitrogen in the air supply and passing only oxygen. When air is passed through a container filled with zeolite particles, the nitrogen in the air is adsorbed into the minute spaces in and between the zeolite particles and only oxygen flows out through an outlet in the container. When all the zeolite particles are saturated, as the amount of nitrogen which can be adsorbed by zeolite is limited, the apparatus loses its ability to separate oxygen and nitrogen and passes both oxygen and nitrogen. At this time, the air inlet and oxygen outlet are closed and the nitrogen adsorbed in the container is sucked out completely so that the zeolite recovers its nitrogen adsorbing ability. By repeating the cycle of nitrogen adsorption and removal, newly supplied air to the zeolite apparatus is separated into oxygen and nitrogen in the same manner.

Figure 6:
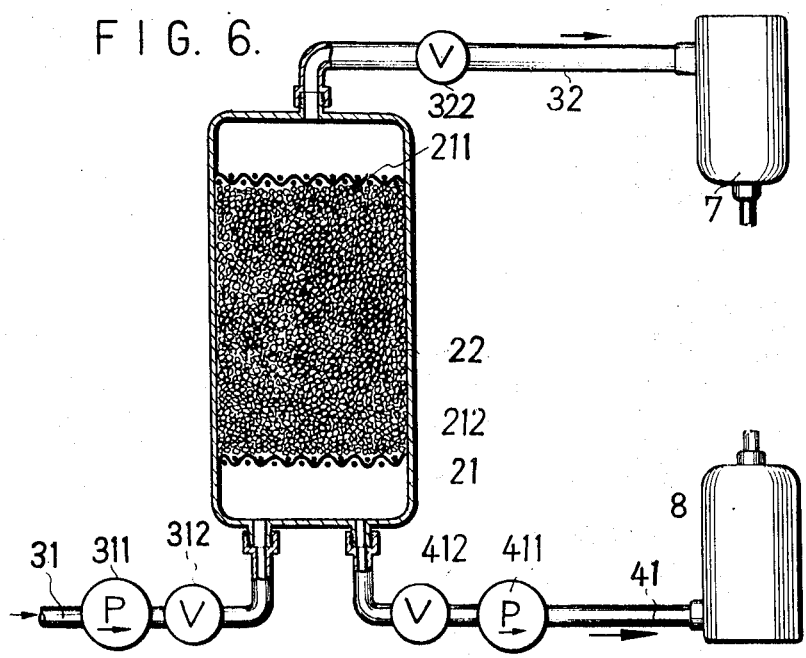
FIG. 6 is a diagram of a modified embodiment employing a container with zeolite and accessory apparatus for obtaining oxygen and nitrogen from the atmosphere to replenish the oxygen and nitrogen sources of the FIG. 3 embodiment.
Figure 7:
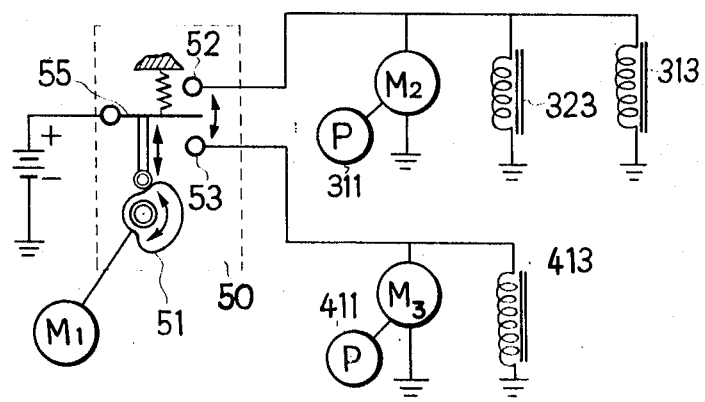
FIG. 7 is an electric circuit diagram for the operation of pumps and control valves in the air intake line, and oxygen and nitrogen supply lines of the zeolite container of the embodiment shown in FIG. 6.

FIG. 6 shows a preferred embodiment of the invention employing zeolite. Zeolite particles 22 are filled between perforated plates 211 and 212 in the container 21 which forms the main body of the zeolite apparatus. Any zeolite particles having the ability to separate oxygen from nitrogen, whether they are a natural, or a synthetic, product can be used. One end of the container 21 is provided with an air intake pipe 31 having a pump 311 and a control valve 312. A nitrogen suction conduit 41 having a vacuum pump 411 and a control valve 412 is connected at one end to the container and at the other end is connected to the nitrogen tank 8. The other end of the container 21 is provided with an oxygen conduit 32 leading to the oxygen tank and having a control valve 322. The described apparatus is repetitively cycled as follows. During the air intake portion of the cycle, the pump 311 driven by motor $M_2$, FIG. 7, is operated to feed air into the container 21, wherein nitrogen is adsorbed from the air and only oxygen is passed through the oxygen conduit 32 for storing in the oxygen tank 7. During this portion of the cycle, the control valve 412 of the nitrogen suction pipe 41 is closed, and the vacuum pump 411 is not operated. When the zeolite particles 22 become saturated with nitrogen, the operation of the air intake pump 311 is stopped and the control valves 322 and 312 are closed. By opening the control valve 412 and starting the operation of the vacuum pump 411, the nitrogen adsorbed by the zeolite is drawn out of the container 21 and passed through the nitrogen supply pipe 41 for storing in the tank 8. Valves 312 and 322 are opened, valve 412 is closed, and pump 411 is stopped, and the cycle is repeated as often as necessary. The mechanism by which the oxygen and nitrogen are supplied into the engine carburetor from the oxygen tank 7 and the nitrogen tank 8 is shown in FIG. 3, and has been explained above.

Repetition of the cycle of adsorption and removal of nitrogen in the zeolite may be made periodically at fixed intervals of time, if the volume of air treated in each cycle is constant. Therefore, when the control valves 312, 322 and 412 are electromagnetic valves, opened by applying an electric current, and closed by breaking the current, and each pump is driven by a motor, the above-described operation may be practiced automatically with the electric circuit shown in FIG. 7. By means of the electric timer 50, having cam 51 driven by motor $M_1$ and having a large radius portion which pushes up the movable contact 55 to close against the terminal 52, electric current is passed from the unnumbered battery to the motor $M_2$ to operate the air intake pump 311. Simultaneously, the electromagnetic valve solenoids 313 and 323, being in parallel with motor $M_2$, are energized to open the control valve 312 of the air suction pipe 31, FIG. 6, and the control valve 322 of the oxygen conduit 32, thus feeding oxygen to cylinder 7. To remove nitrogen from the zeolite when saturated, the small radius portion of the cam 51 lowers the movable contact 55 to engage to the terminal 53 connected to the motor $M_3$ passing current to operate the vacuum pump 411 and solenoid 413, opening the control valve 412 in the nitrogen suction pipe, thereby supplying to, and storing nitrogen in the tank, or cylinder 8.

When pumps 311 and 411 are driven by an engine output shaft in place of motors $M_1$, $M_2$ and $M_3$, and electromagnetic clutch may be inserted between the engine output shaft and the pump shafts and said clutch may be engaged, or disengaged by an electric current in the same manner as described for the motors of the FIG. 7 circuit.

The present invention, as described above, makes it possible to reduce the generation of pollutants in the exhaust gas over the entire range of engine-operating conditions. Exhaust gas purification is now under heavy public dispute and discussion, and intensive measures are being undertaken for solution of the injuries to the public connected with pollution of the atmosphere, particularly by automobile exhaust systems. The majority of apparatus conventionally proposed, or tried for this purpose, are not intended to positively and completely burn all of the intake gases in the engine cylinders, but merely to purify the exhaust gases and, therefore, the effects obtained are not dependable. According to the present invention, the air-fuel mixture is completely burned in the cylinder, and the generation of harmful components is prevented accompanied by an elevated thermal efficiency of the engine, itself. The apparatus and method disclosed herein completely burns the fuel without generating harmful components, and this should solve the problem of exhaust gas pollution in internal combustion engines.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What I claim is:

1. The method of reducing pollutants in the exhaust gas of an internal combustion engine of the type wherein air-fuel mixture is supplied to the engine combustion chamber through an air suction pipe having a carburetor with a main nozzle and a throttle valve, comprising the steps of feeding oxygen to the air-fuel mixture in said carburetor when the throttle valve is between closed and approximately one-fourth open and the engine is operating at light load, stopping said feeding of oxygen and feeding an inactive gas to the air-fuel mixture in said carburetor when the throttle valve is approximately between one-fourth and three-fourths open and the engine is operating at medium load condition, and stopping said feeding of inactive gas and again feeding oxygen to the air-fuel mixture in the carburetor when the throttle valve is between approximately three-fourths and fully open and the engine is operating at full load condition.

2. The method according to claim 1, wherein said inactive gas is nitrogen.

3. Apparatus for reducing pollutants in the exhaust gas of an internal combustion engine of the type wherein air-fuel mixture is supplied to the engine combustion chamber through an air suction pipe having a carburetor with a main nozzle and a throttle valve, comprising an oxygen supply source, an oxygen feed conduit connecting said oxygen supply source to said air suction pipe, and control means in said oxygen feed conduit linked to said throttle valve and operative to feed oxygen to said air suction pipe only when said throttle valve is between closed and approximately one-fourth open, corresponding to light load engine operating condition, and between approximately three-fourths and fully open, corresponding to full load engine operating condition.

4. Apparatus for reducing pollutants in the exhaust gas of an internal combustion engine according to claim 3, wherein is additionally provided an inactive gas supply source, and an inactive gas feed conduit connecting said inactive gas supply source to said air suction pipe, said control means being additionally operative to feed inactive gas to said air suction pipe only when said throttle valve is between approximately one-fourth and three-fourths open and the engine is operating at medium load.

5. Apparatus for reducing pollutants in the exhaust gas of an internal combustion engine according to claim 4, wherein said inactive gas supply source contains nitrogen.

6. Apparatus for reducing pollutants in the exhaust gas of an internal combustion engine according to claim 4, wherein said control means includes a valve mechanism positioned in said oxygen supply conduit and in said inactive gas supply conduit, said valve mechanism being mechanically linked to said throttle valve to move therewith and being operative to open the oxygen supply conduit and close the inactive gas supply conduit when said throttle valve is between closed and approximately one-fourth open, to close said oxygen supply conduit and open said inactive gas supply conduit when said throttle valve is between one-fourth and three-fourths open, and to open said oxygen supply conduit and close said inactive gas supply conduit when said throttle valve is between approximately three-fourths and fully open.

7. Apparatus for reducing pollutants in the exhaust gas of an internal combustion engine according to claim 6, wherein said valve mechanism comprises a cylinder in whose wall are provided two pairs of ports, said pairs of ports facing each other diametrically of said cylinder and one port of the first pair of ports being connected to the oxygen supply conduit and one port of the second pair of ports being connected to the inactive gas supply conduit, a spool slidable within said cylinder having one end connected to said throttle valve to move therewith and thereby slide the spool within the cylinder corresponding to the opening and closing movements of the throttle valve, said spool having two annular grooves positioned so that said first pair of ports aligns with one groove of the spool to pass oxygen, and said other groove aligns with said second pair of ports to pass inactive gas when the first groove is out of alignment with the first pair of ports.

8. Apparatus for reducing pollutants in the exhaust gas of an internal combustion engine according to claim 5, wherein is additionally provided a container having zeolite particles therein for separating oxygen from nitrogen, an air intake pipe connected to said container for supplying air thereto, an oxygen supply pipe connected to the opposite end of the container and communicating at its other end with said oxygen supply source, a nitrogen supply pipe connected at one end to the same end of said zeolite container to which said air intake pipe is connected and communicating at its other end with said nitrogen supply source and nitrogen supply conduit, first, second and third valves respectively positioned in said air intake pipe, oxygen supply pipe and nitrogen supply pipe, and means for periodically opening said first and second valves while closing the third valve and then closing the first and second valves while opening the third valve.

9. Apparatus for reducing pollutants in the exhaust gas of an internal combustion engine according to claim 8, wherein said means for periodically operating said first, second and third valves comprises a timer device including a cam and a cam follower connected to a switching means, said switching means being operative to electrically actuate said first, second and third valves and to alternately operate a first pump in said air intake pipe and a second pump in said nitrogen supply pipe.